(12) United States Patent
Kim

(10) Patent No.: US 11,020,819 B2
(45) Date of Patent: Jun. 1, 2021

(54) HOT STAMPING METHOD FOR SIMULTANEOUSLY FORMING WORKPIECES, AND HOT-STAMPED PRODUCT

(71) Applicants: Hyundai Motor Company, Seoul (KR); Kia Motors Corporation, Seoul (KR)

(72) Inventor: So-Youn Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 206 days.

(21) Appl. No.: 16/196,760

(22) Filed: Nov. 20, 2018

(65) Prior Publication Data

US 2020/0114465 A1    Apr. 16, 2020

(30) Foreign Application Priority Data

Oct. 10, 2018  (KR) .................. 10-2018-0120643

(51) Int. Cl.
*B23K 26/00*    (2014.01)
*B23K 26/211*   (2014.01)
*B21D 22/02*    (2006.01)
*B23K 26/32*    (2014.01)
*B23K 103/04*   (2006.01)

(52) U.S. Cl.
CPC ........ *B23K 26/0093* (2013.01); *B21D 22/022* (2013.01); *B23K 26/211* (2015.10); *B23K 26/32* (2013.01); *B23K 2103/04* (2018.08)

(58) Field of Classification Search
CPC . B23K 26/0093; B23K 26/211; B21D 22/022
See application file for complete search history.

(56) References Cited

U.S. PATENT DOCUMENTS

| | | | |
|---|---|---|---|
| 7,939,182 B2 * | 5/2011 | Cottignies | C22C 1/03 428/654 |
| 2014/0239672 A1 * | 8/2014 | Yajima | B21D 35/007 296/193.06 |
| 2015/0043962 A1 * | 2/2015 | Miyazaki | C22C 21/02 403/271 |

FOREIGN PATENT DOCUMENTS

KR   10-1505272 B1   3/2015

* cited by examiner

*Primary Examiner* — Nicholas A Wang
*Assistant Examiner* — Jiangtian Xu
(74) *Attorney, Agent, or Firm* — Mintz Levin Cohn Ferris Glovsky; Peter F. Corless

(57) ABSTRACT

A hot stamping method for simultaneously forming workpieces includes steps of: performing laser welding to which an aluminum filler wire is applied to a welding site between the two or more sheets of blanks, and hot-stamping the two or more sheets of blanks, which are welded in the step of performing the laser welding.

6 Claims, 8 Drawing Sheets

GENERATION OF WELDING CRACK

HOT STAMPING METHOD FOR SIMULTANEOUSLY FORMING WORKPIECES, AND HOT-STAMPED PRODUCT

CROSS-REFERENCE TO RELATED APPLICATION(S)

This application claims under 35 U.S.C. § 119(a) the benefit of Korean Patent Application No. 10-2018-0120643, filed on Oct. 10, 2018, which is incorporated by reference herein.

BACKGROUND

(a) Technical Field

The present disclosure relates to a hot stamping forming method for manufacturing parts of a vehicle, and more particularly, to a hot stamping method for simultaneously forming two or more sheets of blanks and a hot-stamped product produced by the hot stamping method.

(b) Description of Related Art

A hot stamping forming method refers to a method in which a steel workpiece heated to a high temperature is put into a mold, formed by a press, and is then rapidly cooled in the mold.

The method can make a raw workpiece into an ultra-high tensile steel having tensile strength more than a required value, machine the raw workpiece in a complicated shape, and has advantage of having excellent dimensional accuracy, and thus this method has been employed for manufacturing steel parts for a vehicle or the like.

Meanwhile, if a finished product is manufactured by joining two or more sheets of blanks, when a conventional hot stamping method is applied, the finished product can be manufactured by heating, forming and cooling each of the blanks which are separately cut, and then joining them by welding or the like.

On the other hand, in a hot stamping technique for simultaneously forming workpieces, which simplifies the stamping method, as shown in FIG. 1, each of the workpieces is cut, and then the workpieces are preliminarily welded by spot welding or the like, and the workpieces are simultaneously hot-stamped by a hot stamping device.

After hot stamping of the two or more sheets of blanks as described above, an additional assembling process for the blanks is performed to manufacture the finished product.

A welding joining through spot welding can also be employed in an additional assembling process.

In this hot stamping method for simultaneously forming the workpieces, when a welding site is positioned at a portion where forming is performed due to bending or the like (a portion where tensile stress is highly applied), welding cracks may be generated as shown in FIGS. 2 and 3 due to a rigid characteristic of the welding site. FIG. 3 is a photograph showing a cross-section of the welding site.

Conventionally, accordingly, due to cracks generated at the welding site, after a preliminary welding is performed for only a flat portion between the blanks, the hot stamping is inevitably carried out. As a result, as shown in FIG. 1, after performing the hot stamping process, an additional assembling process should be performed for a side wall portion and the like, to which excessive tensile stress is applied.

The contents described in the Description of Related Art are intended to aid in the understanding of the background of the present disclosure, and may include what is not previously known to those skilled in the art to which the present disclosure pertains.

SUMMARY

An object of the present disclosure is to provide a hot stamping method for simultaneously forming workpieces, which may secure ductility of a welding site between two or more sheets of blanks so as to simplify the hot stamping method, and a hot-stamped product formed by the hot stamping method.

A hot stamping method for simultaneously forming work pieces according to one aspect of the present disclosure includes steps of: performing laser welding to which an aluminum (Al) filler wire is applied to a welding site between the two or more sheets of blanks; and hot-stamping the two or more sheets of blanks, which are welded in the laser welding step, so as to form a finished product.

In addition to a flat welding site, the welding site may include an over-tensile welding site to which tensile stress is applied to a greater extent than that applied to the flat welding site.

Here, the Al filler wire may contain silicon (Si) of 0.25 wt % or more and less than 10 wt % based on the total weight.

In addition, the Al filler wire may contain magnesium (Mg) of 4.5 wt % or more and less than 15 wt % based on the total weight.

Meanwhile, the Al filler wire may contain silicon of 0.25 wt % or more and less than 10 wt %, magnesium of 4.5 wt % or more and less than 15 wt % based on the total weight, and remainder of Al.

In addition, each of the two or more sheets of blanks may have a plated layer formed thereon.

Here, the plated layer may be Al—Si plated layer or Zn-plated layer.

Next, a hot-stamped product according to one aspect of the present disclosure may be manufactured by the above-mentioned hot stamping method.

In addition, a hot-stamped product according to another aspect of the present disclosure may be manufactured by welding and then hot stamping two or more sheets of blanks, wherein a ferrite microstructure is formed in a welding site between the two or more sheets of blanks after hot stamping the two or more sheets of blanks.

DESCRIPTION OF SPECIFIC EMBODIMENTS

Figure 1:
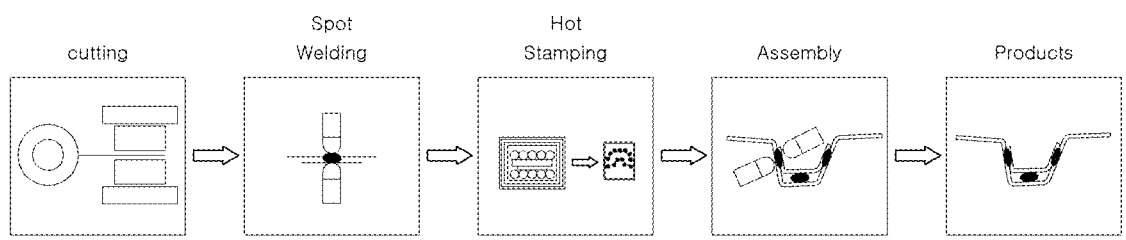
FIG. 1 (PRIOR ART) is a view schematically illustrating a conventional hot stamping process for simultaneously forming workpieces.
Figure 2:
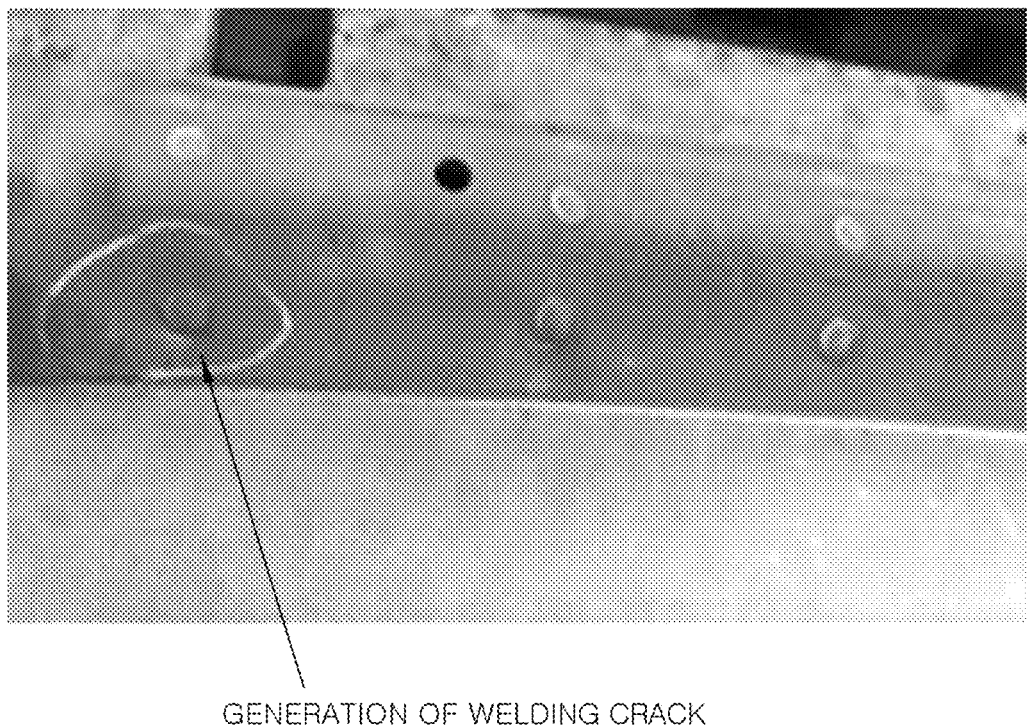
FIGS. 2 and 3 (PRIOR ART) are views illustrating problems caused by the conventional process.
Figure 3:
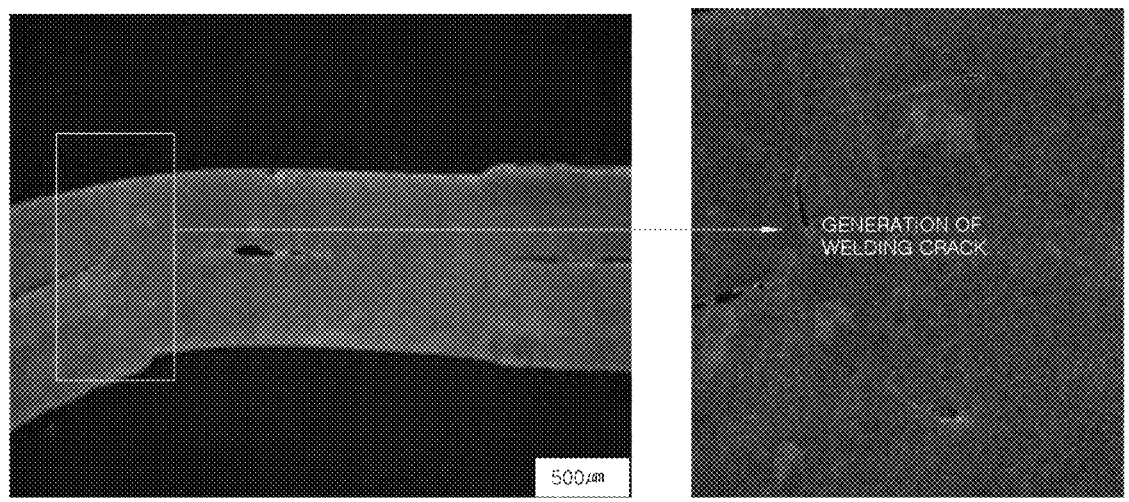

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure, operational advantages of the present disclosure, objects achieved by embodiments of the present disclosure, reference should be made to the accompanying drawings and contents illustrated in the accompanying drawings which illustrate the preferred embodiments of the present disclosure.

In describing the preferred embodiments of the present disclosure, well-known techniques or repetitive descriptions that may unnecessarily obscure the gist of the present disclosure will be reduced or omitted.

Figure 4:
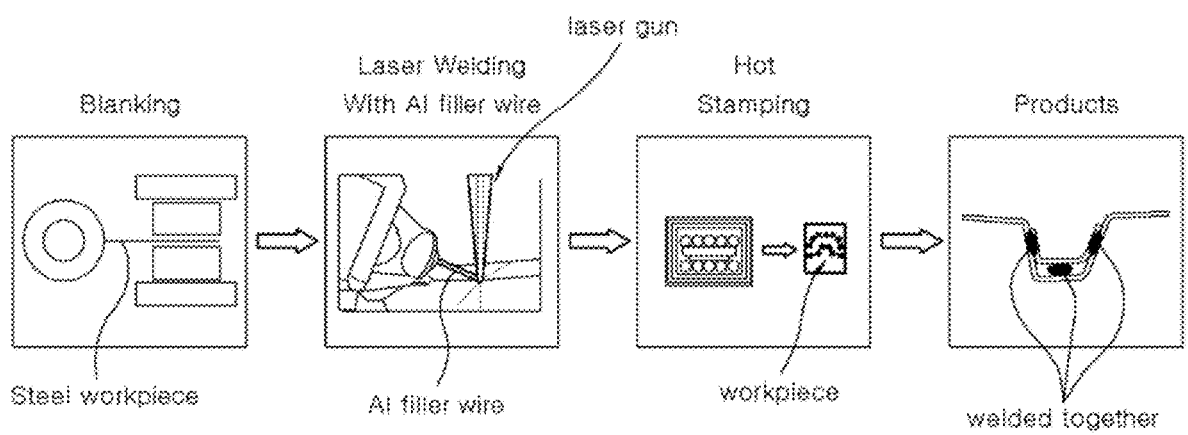
FIG. 4 is a view schematically illustrating a hot stamping process for simultaneously forming workpieces according to the present disclosure.

FIG. 4 schematically illustrates a hot stamping process for simultaneously forming workpieces according to the present disclosure.

Hereinafter, a hot stamping method for simultaneously forming workpieces according to the present disclosure is described with reference to FIG. 4.

First, a plurality of steel workpieces are prepared by cutting each of them.

Cutting may be performed by a laser cutting process, a blanking process, or the like.

The steel workpiece may contain carbon (C) of 0.1-0.5 wt %, silicon (Si) of 0.1-0.5 wt %, manganese (Mn) of 1.0-2.0 wt %, phosphorus (P) of 0.05 wt % or less, sulfur (S) of 0.005 wt % or less, boron (B) of 0.005 wt % or less, and remainder of iron (Fe) and inevitable impurities.

As an example, two sheets of steel workpieces are described as the plurality of steel workpieces, and welding is performed for a plurality of welding sites between two sheets of blanks prepared by a cutting process.

In the present disclosure, a laser welding is performed as the welding, and an aluminum (Al) filler wire is applied to the laser welding.

As will be described later, in the hot stamping method of the present disclosure, by performing the laser welding to which the Al filler wire is applied, it is possible to secure ductility of the welding site.

Therefore, in addition to a flat welding site that forms a generally flat surface in a finished product, the plurality of welding sites on which welding is performed may also include an over-tensile welding site to which tensile stress is applied to a greater extent than that applied to the flat welding site during hot stamping.

After performing such laser welding, the joined blanks are simultaneously manufactured in the shape corresponding to a shape of the finished product through a hot stamping process involving heating and cooling processes, the finished product is completed without performing an additional assembling process.

In the hot stamping method for simultaneously forming the workpieces according to the present disclosure, ductility of the welding site is increased by performing the laser welding to which the Al filler wire is applied, and the welding site is then subjected to the hot stamping.

As a result, before the hot stamping, it is also possible to perform the welding even for the welding site where tensile stress is excessively applied, and this make an assembling process unnecessary after the hot stamping process.

Figure 5:
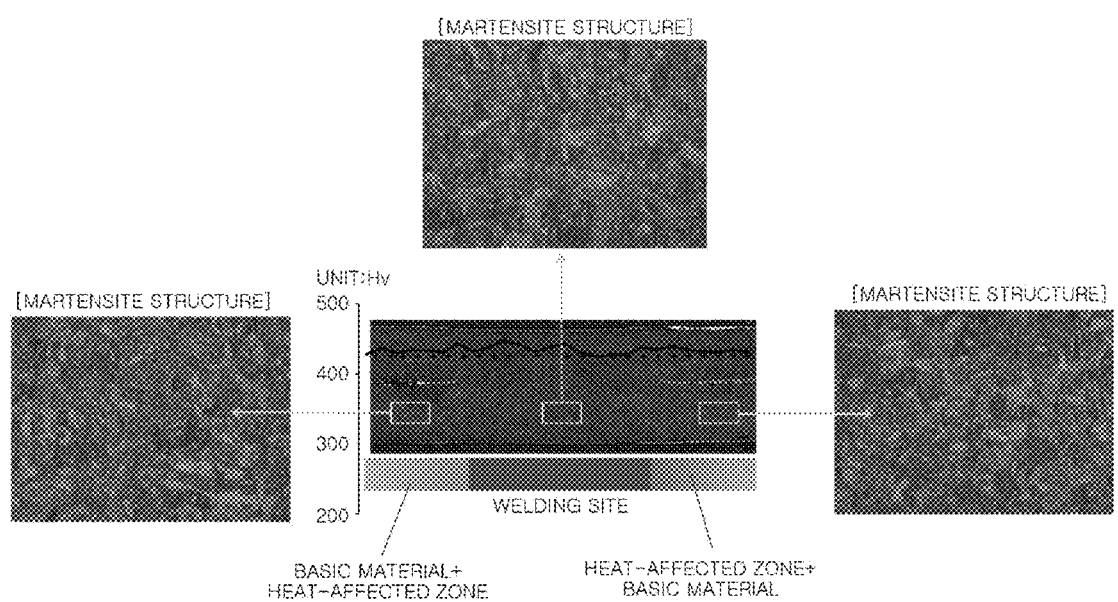
FIG. 5 is a view showing a result of metallographic test of a welding site formed by a conventional art.
Figure 6:
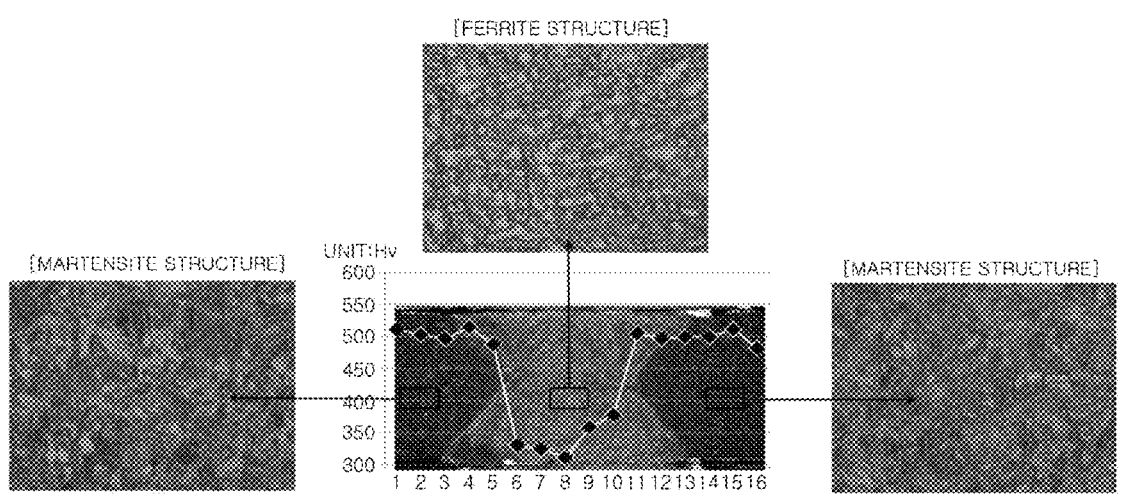
FIG. 6 is a view showing a result of metallographic test of a welding site formed by the present disclosure.

FIGS. 5 and 6 show the results of metallographic test for confirming ductility of such welding sites, FIG. 5 shows the result for the welding site obtained by a conventional method, and FIG. 6 shows the result for the welding site obtained by the present disclosure.

As illustrated in FIG. 5, as a result of the metallographic test for a cross section of the welding site, a martensite structure is appeared in all of the welding site, a basic material adjacent to the welding site and a heat-affected zone after the hot stamping.

In addition, hardness value of 425 Hv or more is uniformly represented for each cross-sectional position.

In other words, due to creation of martensite which is a brittle structure, ductility of the welding site is lowered, and thus, the formability is also inevitably deteriorated. Therefore, the conventional method cannot be applied to a site other than the flat welding site.

On the other hand, as a result of the metallographic test for a cross section of the welding site obtained by the present disclosure, as shown in FIG. 6, although existing martensite structure is appeared in the basic material, the welding site includes a ferrite structure which is the ductile phase.

Figure 7:
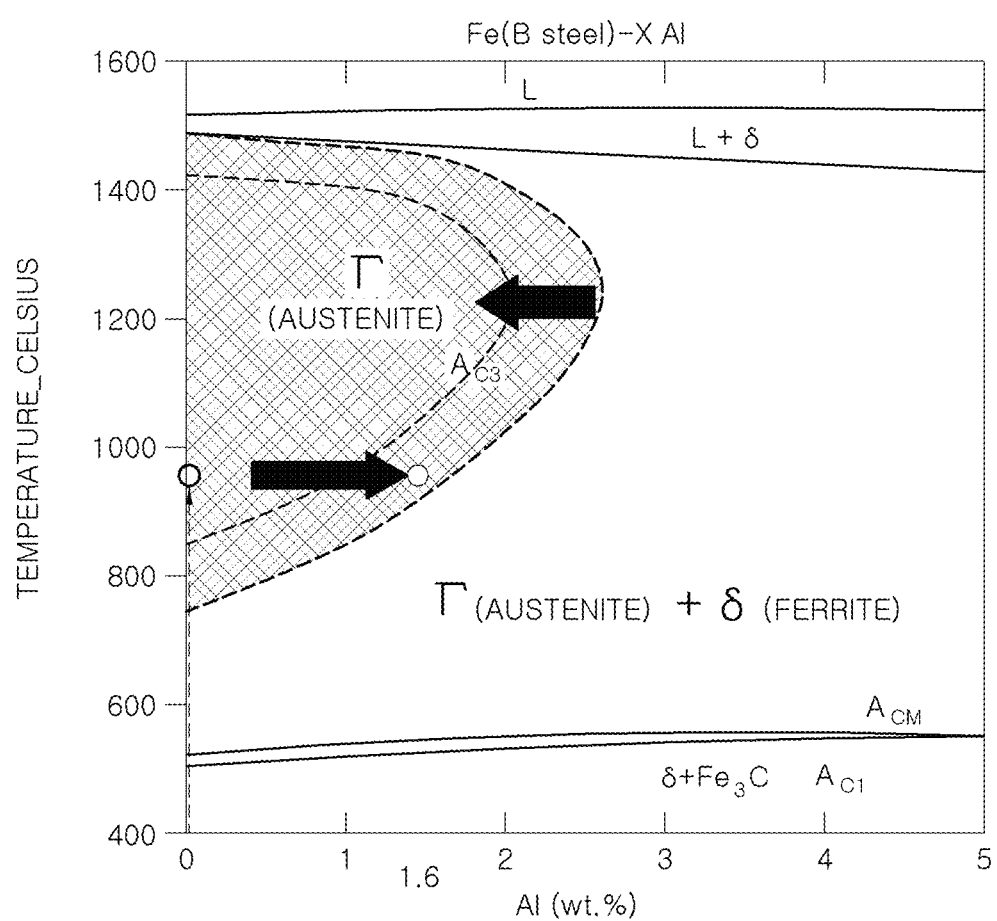
FIG. 7 is a view showing a variation of microstructure according to aluminum (Al) component of the welding site in accordance with one embodiment of the present disclosure.

This is because Al component is the ferrite-stabilizing element, and as known from FIG. 7 showing a variation of structure according to aluminum and a temperature, as the amount of added Al component in the welding site is increased by the Al filler wire, the ferrite shifts in an arrow direction, so that the ferrite phase is appeared in the welding site.

Also, the welding site has the uniform hardness value of 300~400 Hv.

Figure 8:
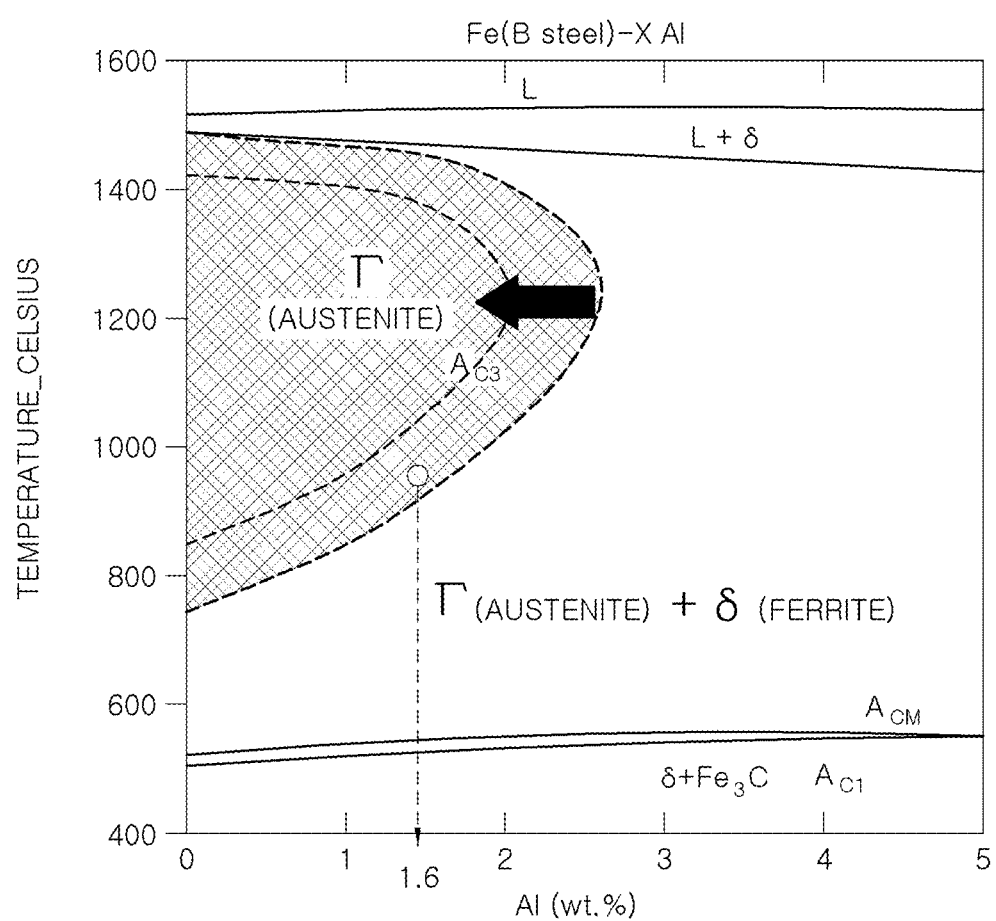
FIG. 8 is a view showing a variation of microstructure according to aluminum component of the welding site in accordance with another embodiment of the present disclosure.

Although FIG. 7 shows the case in which no plated layer is formed on the basic material or zinc-plated layer is formed on the basic material, when a plated layer is formed by Al—Si plating and a thickness thereof is 20 to 30 μm, as illustrated in FIG. 8, an Al component of about 1.6 wt % is included in the welding site even when the Al filler wire is not applied.

As shown in FIG. 8, however, full austenite is formed at a heating temperature of 900 to 950° C. during the hot stamping to form full martensite structure upon cooling. That is, no ferrite structure is formed.

Taking the above into consideration, therefore, even when the Al—Si-plated layer is formed, it is preferable to reduce the austenite zone in a heating zone by increasing the amount of added Al component, which is a ferrite stabilizing element, and shifting the ferrite in the arrow direction through applying the Al filler wire.

In addition, the Al filler wire contains Si and Mg to improve fluidity and strength of the welding site.

Si is preferably contained in an amount of 0.25 wt % or more based on the total weight for improving fluidity of the welding site, and is limited to the amount of less than 10 wt %. If the amount of Si is excessively high such as 10 wt % or more, the fluidity becomes too strong, and thus Si can inhibit solidification of the welding site.

Mg is contained as a strengthening mechanism for enhancing strength of the welding site through solid-solution strengthening and is preferably contained in an amount of 4.5 wt % or more based on the total weight for the effect of enhancing strength.

Ductility of the welding site is increased due to the ferrite phase thereof, but it is preferable that Mg is contained in an amount of 4.5 wt % or more in order to maintain strength of the welding site at an appropriate level of 300 Hv or more. However, the amount of Mg is limited to the amount of less than 15 wt %. This is because if the amount of Mg is excessively high such as 15 w % or more, brittleness of the welding site becomes too strong.

Then, the remainder is the content of Al.

As described above, in the hot stamping method for simultaneously forming the workpieces according to the present disclosure, by applying the Al filler wire, it is possible to perform the welding even for the welding site other than the flat welding site, and thus a separate assembling process can be omitted after the hot stamping.

According to the hot stamping method for simultaneously forming the workpieces according to the present disclosure, by performing the laser welding to which the Al filler wire is applied and then simultaneously forming the blanks, it is possible to secure ductility of the weld site between two or more sheets of blanks.

Due to the above, before performing the hot stamping process, the welding can be performed not only for the flat site of two or more sheets of the blanks, but also all sidewall sites to which a tensile force is excessively applied, and thus a separate assembling process cannot be required after performing the hot stamping to simplify the process.

Although the present disclosure has been described with reference to the illustrative drawings, it will be apparent to those skilled in the art that various changes and modifications can be made without departing from the scope of the present disclosure. Accordingly, such modifications or changes should be considered as being fallen with the claims of the present disclosure, and the scope of the present disclosure should be construed on the basis of the appended claims.

What is claimed is:

1. A hot stamping method for simultaneously forming steel workpieces, comprising the steps of:
    performing laser welding to which an aluminum (Al) filler wire is applied to a welding site between two or more sheets of blanks; and
    hot-stamping the two or more sheets of blanks, which are welded in the step of performing the laser welding, so as to form a finished product,
    wherein, in addition to a flat welding site, the welding site comprises an over-tensile welding site to which tensile stress is applied to a greater extent than that applied to the flat welding site.

2. The hot stamping method of claim 1, wherein the Al filler wire contains silicon (Si) of 0.25 wt % or more and less than 10 wt % based on the total weight.

3. The hot stamping method of claim 1, wherein the Al filler wire contains magnesium (Mg) of 4.5 wt % or more and less than 15 wt % based on the total weight.

4. The hot stamping method of claim 1, wherein the Al filler wire contains silicon of 0.25 wt % or more and less than 10 wt %, magnesium of 4.5 wt % or more and less than 15 wt % based on the total weight, and remainder of Al.

5. The hot stamping method of claim 1, wherein each of the two or more sheets of blanks has a plated layer formed thereon.

6. The hot stamping method of claim 5, wherein the plated layer is Al—Si plated layer or Zn-plated layer.

* * * * *